(No Model.)
R. M. GARDINER.
COMBINED GROCER'S PACKAGE, GRATER, SLICER, AND MOUSE AND FLY TRAP.
No. 586,025.  Patented July 6, 1897.
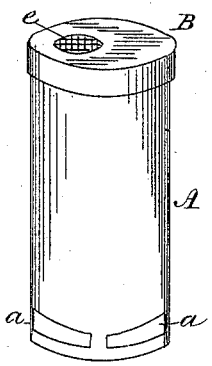
Fig. 1.
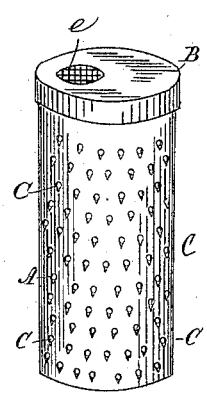
Fig. 2.
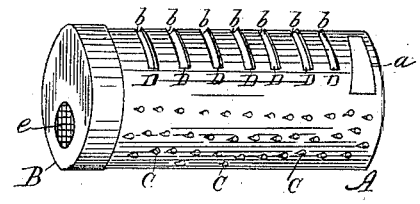
Fig. 3.
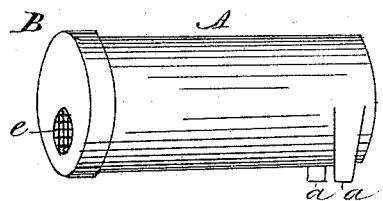
Fig. 4.
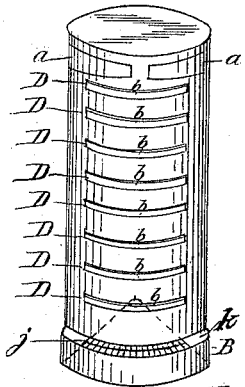
Fig. 7.
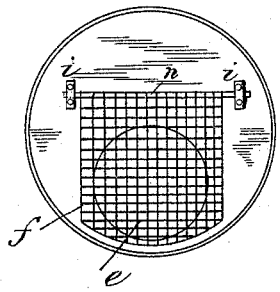
Fig. 8.
Fig. 6.
Fig. 5.
Witnesses
D. B. Pilkey
A. Kane.
Inventor
Robert M. Gardiner
By W. Bruce
Att'y

UNITED STATES PATENT OFFICE.

ROBERT MARTIN GARDINER, OF HAMILTON, CANADA, ASSIGNOR OF TWO-THIRDS TO CHARLES S. COCHRAN AND HENRY E. RALSTON, OF SAME PLACE.

COMBINED GROCER'S PACKAGE, GRATER, SLICER, AND MOUSE AND FLY TRAP.

SPECIFICATION forming part of Letters Patent No. 586,025, dated July 6, 1897.

Application filed January 13, 1897. Serial No. 619,032. (No model.)

*To all whom it may concern:*

Be it known that I, ROBERT MARTIN GARDINER, electrician, a citizen of the Dominion of Canada, residing at the city of Hamilton, in the county of Wentworth, in the Province of Ontario, Canada, have invented a certain new and useful Combined Grocer's Package, Grater, Slicer, and Mouse and Fly Trap; and I do hereby declare that the following is a full, clear, and exact description of the construction and operation of the same.

My invention relates to the construction of a grocer's sheet-metal box in such a manner as to be useful for other purposes, (after the first contents are removed,) such as a grater, shredder, slicer, and mouse and fly trap. I attain these objects by the construction illustrated in the accompanying drawings, in which—

Figure 1 represents a sheet-metal cylindrically-shaped grocer's package or box with feet attached to one end. Fig. 2 represents a similar figure, showing the opposite side constructed as a grater. Fig. 3 represents the same constructed as a slicer. Fig. 4 represents the same as a mouse-trap. Fig. 5 represents the body with vertical feet at one end, preparatory to using it as a fly-trap. Fig. 6 represents the conical wire attachment for the box when used as a fly-trap. Fig. 7 represents the box, the wire-gauze, and box-cover used, complete for a fly-trap.

Similar letters refer to similar parts throughout the several views.

A, Fig. 1, represents a cylindrically-shaped box with cover B on the top, and at the bottom are attached two pieces of sheet metal $a\ a$. These are soldered at one end and the loose end bent to conform to the curvature of the box and are for feet to enable the box to stand horizontally when required to be used as a grater, slicer, or mouse-trap. These feet are made to lie close to the box when in an upright position, as in Fig. 1, and the loose ends merely pulled out to stand vertically when the box is required to stand in a horizontal position, as shown in said Fig. 4.

C, Fig. 2, shows the openings and cutting edges for the purpose of grating vegetables, fruit, &c. These openings may be of any form or size, with a part or a whole of the edge turned outwardly to form a rough and cutting surface suitable for the operation of grating.

On the opposite side of the box A are cut a series of parallel slots or openings D, about one-sixteenth of an inch wide and two inches long and having one edge $b$ turned up or outward on the margin of each slot to form a cutting edge for the purpose of slicing vegetables.

On the lid B of the box a circular hole $e$ is cut about an inch and a quarter in diameter, and on the inside of the said cover is hinged a wire door $f$ at the top by the upper wire $n$ passing through hinge-plates $i\ i$, soldered to the lid, as shown at Fig. 8. The mice will enter the opening $e$. The wire door $f$, swinging inward, will enable them to do so, and when they pass it it drops down against the said opening and closes it so effectually as to prevent all egress of the mice.

When the box A is to be used as a fly-trap, a cone-shaped wire diaphragm $j$, with a hole in the center, as in Fig. 6, is placed at the lid end of the box A when it is laid on a table or other convenient place, three strips of sheet metal $h$ previously being soldered to the mouth of the box A, and when the box is used as a grocer's package they are bent back out of the way, and when used as a fly-trap the said strips are bent outward, projecting from the mouth of the box about half an inch, and when the box is inverted on the cover the said strips form legs, upon which the box stands, leaving an annular space $k$ of about one-quarter of an inch wide between the edge of the box A and its inverted cover B beneath it for the ingress of flies, who enter and crawl up the wire cone through a hole in the apex and are encaged in the upper part of the said box A.

It will be observed that merchandise—such as coffee, baking-powder, &c.—when my improved construction of grocers' box is employed for packing them, will be first placed in paper bags to correspond to the cylindrical shape of the box, then inserted in the box, and after the contents are exhausted then the box can be used for a grater, slicer, mouse-trap, or fly-trap, as desired, thus utilizing the great waste of such grocers' boxes as are thrown away after the contents are removed.

It will be further observed that the wire trap-door hereinbefore described as hanging over the opening in the cover and automatically closing it when the can is used for a mouse-trap may be secured to the mouth of the can itself and operate in the same manner without the cover, but I prefer it attached to the cover as more convenient. It will also be seen that I do not confine myself to the cylindrical shape of the box as shown, but may use other forms, such as square or oblong, &c., and also that I do not confine myself to the size and shape of the opening in the lid or cover when the box will be used as a mouse-trap, as various devices can be employed for that purpose. The cover can be dispensed with altogether and a series of wire rods may be hinged to a circular-shaped rod, with its ends affixed to the sides of the box or can, and the wire rods shaped at the inner ends, slanting inward, will guard the entrance of the can and allow mice to enter, but not return.

Having thus described my device and its advantages, what I claim as my invention, and desire to secure by Letters Patent, is—

1. In a grocer's tin can or box, strips of flexible sheet metal secured at one end to the can, the same being capable of folding on the can and adapted to its cylindrical shape when not in use, and bent outward to form legs to sustain the can in a horizontal position when used as a grater, slicer, &c., substantially as, and for the purpose specified.

2. The combination in a grocer's can of the box A, cover B, the grater-perforations C, and the flexible strips a, a, for legs secured at one end of the can, the same being capable of folding on the can and adapted to its cylindrical shape when not in use, and bent outward to form legs to sustain the can in a horizontal position when used as a grater, slicer, &c., substantially as and for the purpose specified.

3. The combination in a grocer's can, the box A, the cover B, the grater-perforations C, the slicer-slots D, and the flexible strips a, a, for legs secured at one end of the can, the same being capable of folding on the can and adapted to its cylindrical shape when not in use, and bent outward to form legs to sustain the can in a horizontal position when used as a grater, slicer, &c., substantially as specified.

4. The combination in a grocer's tin can or box, of the body A, having its cover B, constructed with an opening e, and a trap-door f, hinged over the opening on the inside of the cover to close the opening from that side and the flexible strips a, a, for legs secured at one end of the can, the same being capable of folding on the can and adapted to its cylindrical form when not in use, and bent outward to form legs to sustain the can in a horizontal position when used as a grater, slicer, and mouse-trap, substantially as and for the purpose specified.

5. The combination in a grocer's tin can or box, of the body A constructed with three legs attached to the sides of the open end of the can, the inverted cover B, and the diaphragm j, all constructed substantially as and for the purpose specified.

6. In a grocer's tin can or box, the body A constructed with grater-openings C, slicer-openings D, provided with thin cutting edges b, opening e, in the cover B, with hinged trap-door f, behind it, the flexible strips a, a, for legs, secured at one end of the can, the same being capable of folding on the can and adapted to its cylindrical form when not in use, and legs h, attached to the sides of the open end of the can and the internal diaphragm fly-trap j, all arranged and constructed substantially as and for the purpose specified.

Dated at Hamilton, Ontario, Dominion of Canada, this 2d day of October, 1896.

ROBERT MARTIN GARDINER.

In presence of—
L. McNEILLY,
W. BRUCE.